No. 733,249. PATENTED JULY 7, 1903.
E. F. MOLCK.
SEEDER.
APPLICATION FILED OCT. 7, 1902.
NO MODEL. 2 SHEETS—SHEET 1.
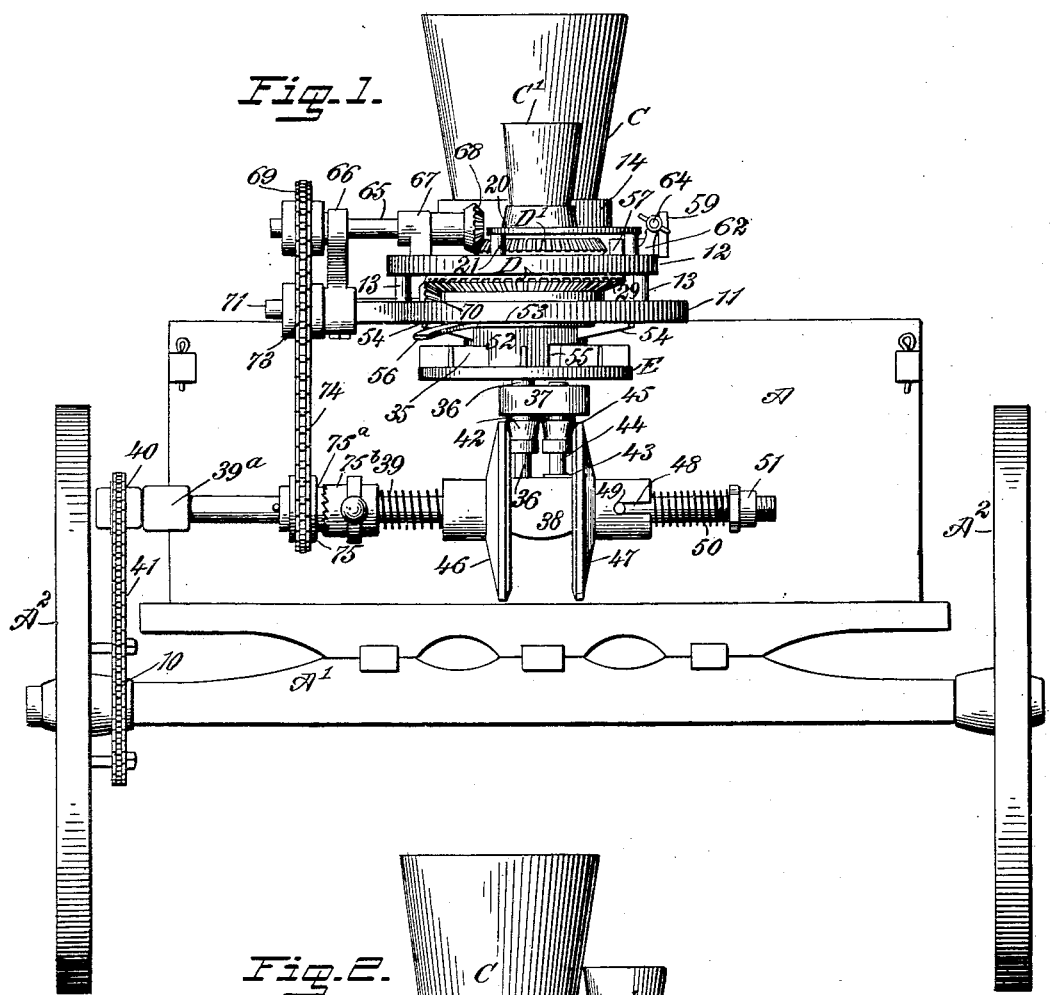
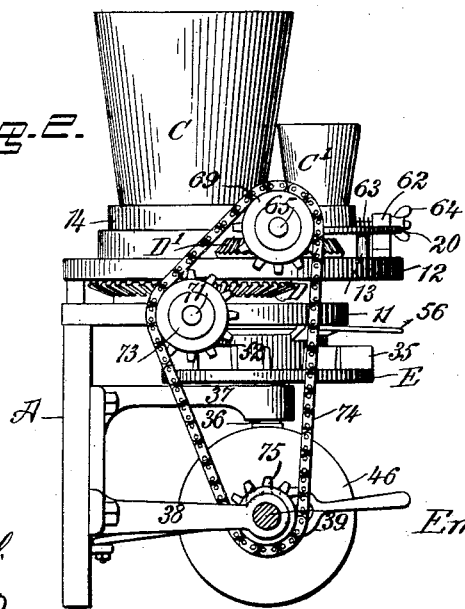
WITNESSES:
James P. Duhamel
INVENTOR
Emil F. Molck
BY
ATTORNEYS.

No. 733,249. PATENTED JULY 7, 1903.
E. F. MOLCK.
SEEDER.
APPLICATION FILED OCT. 7, 1902.
NO MODEL. 2 SHEETS—SHEET 2.

WITNESSES:
INVENTOR
Emil F. Molck
BY
ATTORNEYS.

No. 733,249.   Patented July 7, 1903.

UNITED STATES PATENT OFFICE.

EMIL F. MOLCK, OF SIBLEY, ILLINOIS.

SEEDER.

SPECIFICATION forming part of Letters Patent No. 733,249, dated July 7, 1903.

Application filed October 7, 1902. Serial No. 126,309. (No model.)

*To all whom it may concern:*

Be it known that I, EMIL F. MOLCK, a citizen of the United States, and a resident of Sibley, in the county of Ford and State of Illinois, have invented a new and Improved Seeder, of which the following is a full, clear, and exact description.

The purpose of my invention is to provide an end-gate seeder which will be of simple, durable, and economic construction, being driven from a wheel of the wagon to which the seeder is applied, and to so construct the seeder that dual hoppers are employed, the main hopper carrying such seeds as oats, wheat, barley, rye, &c., while the auxiliary hopper is adapted to contain clover or grass seed.

A further purpose of the invention is to provide a main seed-delivery wheel for the main hopper and an auxiliary seed-delivering wheel for the auxiliary hopper, the auxiliary delivery-wheel being so placed that it will discharge its seed upon the seed in the main delivery-wheel, and the two characters of seeds will be mixed as they drop from the main delivery-wheel.

Another purpose of the invention is to provide a scattering-wheel to receive the seed from the main seed-delivery wheel, and means whereby the seed from the scattering-wheel may be directed immediately behind the wagon or to one side or the other, causing the same amount of seed to be thrown in any direction to which the controlling device may be set.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 3:
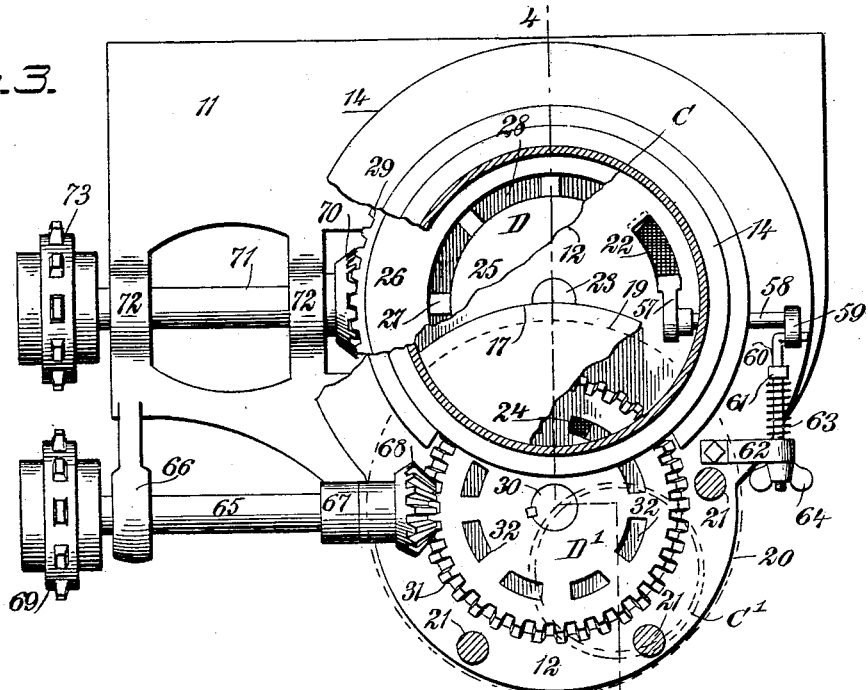

Figure 1 is a rear view of a wagon and a rear elevation of the seeder applied to the end-gate of the wagon. Fig. 2 is a side elevation of the seeder and the end-gate supporting the same. Fig. 3 is a plan view of the seeder, a portion of the bottom of the main hopper and a portion of the upper frame-plate being broken away, the main hopper also appearing in horizontal section, the auxiliary hopper having been removed, its supports appearing in horizontal section; and Fig. 4 is a vertical section on the line 4 4 of Fig. 3.

A represents an end-gate adapted to fit in an ordinary farm-wagon.

A' represents the rear axle of a wagon to which the device is applied, and A² the rear wheels of the wagon, one of which wheels has a sprocket-wheel 10 secured to its spokes.

Figure 4:
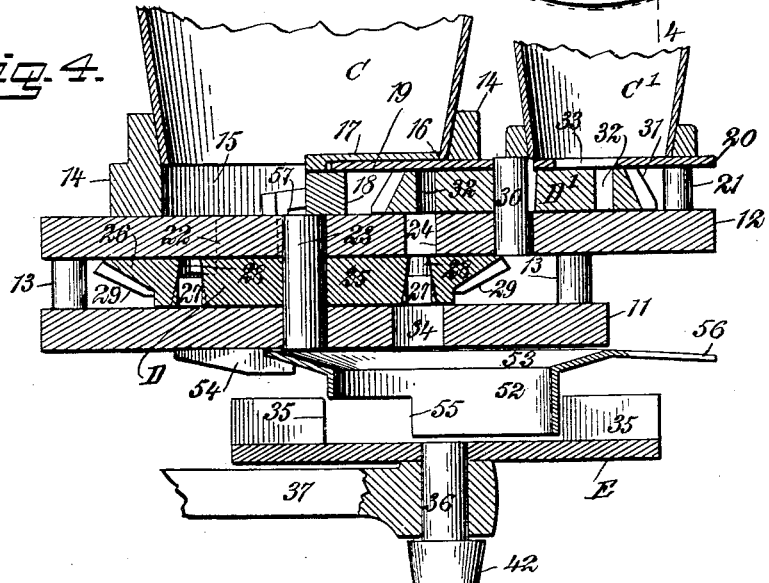

The main frame of the seeder consists of a lower frame-plate 11, which is secured at its forward end in any approved manner to the upper edge of the end-gate A, and an upper frame-plate 12, the two frame-plates 11 and 12 being held separated by pillar-posts 13, as is shown in Figs. 1 and 4. At the forward portion of the upper frame-plate 12 the base 14 of a main hopper C is secured, which main hopper is adapted to receive such seed as wheat, rye, oats, barley, and the like, and the main hopper C is so attached to its base 14 that a chamber 15 is formed between the frame-plate 12 and the under edge of the hopper C, as is best shown in Fig. 4. At the rear portion of the base 14 of the hopper C a segmental opening 16 is formed extending to the frame-plate 12, as is also shown in Fig. 4, and a segmental bottom 17 is formed at the rear portion of the hopper C, as is shown in Figs. 3 and 4, which segmental bottom rests upon a segmental support 18, attached in any approved manner to the upper frame-plate 12, as is shown particularly in Fig. 4.

A top plate 20 is located above the rear portion of the upper frame-plate 12, and the forward portion 19 of this top plate 20 extends through the opening 16 in the base of the hopper C to an engagement with the aforesaid supporting-block 18, as is shown in Fig. 4. The top plate 20 is held removed from the upper frame-plate 12 by means of suitable pillar-posts 21, located at the rear of the base of the main hopper C, and upon the rear portion of the top plate 20 an auxiliary and smaller hopper C' is suitably secured, adapted to receive grass or clover seed.

Within the base 14 of the main hopper C, at one side of the seed-chamber 15, a segmental slot 22 is produced, through which the seed from the main hopper drops and is received by the main seed-delivery wheel D, mounted to turn upon a shaft 23, secured in the frame-plates 11 and 12, as is shown in Fig. 4, and the said shaft is centrally located with respect to the main hopper C. At the rear portion of the upper frame-plate 12 a second outlet-opening 24 is formed, as is shown in Figs. 3 and 4, and this second outlet-opening 24 is so located as to deliver seed to the main delivery-wheel D. This main delivery-wheel D is mounted to turn in the space between the two frame-plates 11 and 12 and consists of a body-section 25 and a rim-section 26, separated from the body-section 25 by spokes 27, which, while flush with the bottom of the body and the rim-sections, do not extend to the top portions thereof. These spokes divide the space between the two sections 25 and 26 of the said main delivery-wheel D into a series of segmental pockets 28. In the rotation of the main delivery-wheel D these pockets are brought beneath the outlet-openings 22 and 24 in the upper frame-plate 12, as is shown in Figs. 3 and 4, receiving seed first from the main hopper C through the openings 22 and next from the auxiliary hopper C' through the openings 24, so that the grass or clover seed is delivered on top of the main seed, and consequently when the seed leaves the pockets 28 the two classes of seeds will be mixed. These pockets 28 are made wider at their bottom portions than at the top, so that the seed can leave the pockets with the least possible amount of friction. At the under portion of the rim-section 26 of the main seed-delivery wheel D bevel gear-teeth 29 are formed, as is illustrated in Figs. 1, 2, and 4.

The seed from the auxiliary hopper C' is received in pockets 32, formed in the auxiliary seed-delivery wheel D', secured upon a shaft 30, mounted to turn in the top plate 20 of the upper frame-plate 12, as is shown in Fig. 4, the said wheel being located between said plates, and at the peripheral portion of the auxiliary seed-delivery wheel D' bevel gear-teeth 31 are formed, having their inclination in an upward direction, the pockets 32, formed in the said wheel D' near the periphery, occupying such a position that in the rotation of the wheel D' the seed from the auxiliary hopper C' will drop through an opening 33 in the bottom of said hopper into a pocket 32, which pocket in the further rotation of the wheel D' will empty itself into a pocket 28 of the main seed-delivery wheel D through the outlet-opening 24 in the upper frame-plate 12, as is clearly shown in Fig. 4.

The main delivery-wheel D discharges the seed from its pockets through an opening 34 made in the bottom frame-plate 11 upon a scattering-wheel E, located below the said frame-plate 11, as is shown in Figs. 1, 2, and 4. This scattering-wheel E is horizontal and consists of a disk-like body provided with radial plates 35, extending from its periphery to within a desired distance of its center, and the scattering-wheel E is secured to the upper end of a vertical shaft 36, which loosely passes through the rear end portion of a horizontal bracket 37, secured to the end-gate A, and the lower end of the shaft 36 is mounted to loosely turn in the rear end portion of a lower horizontal bracket 38, secured to the end-gate, as is shown in Fig. 4. Through the said lower bracket 38 a horizontal drive-shaft 39 is passed, and the said shaft extends beyond both sides of the bracket 38 and beyond that end of the end-gate which is located adjacent to the driving-wheel for the device, being supported at such end of the end gate by a suitable bearing 39ª. At the projecting end of the shaft 39 a sprocket-wheel 40 is secured, connected by a chain belt 41, with the driving sprocket-wheel 10 on the rear wheel A² of the vehicle.

Between the bearings for the shaft 36 said shaft is provided with a conical fixed pulley 42, and parallel with the shaft 36 a second shaft 44 is mounted to turn in boxes 43, having sliding movement in the brackets 37 and 38, and the shaft 44 carries a conical friction-pulley 45, adapted under certain conditions to engage with the pulley 42 on the shaft 36. The shaft 36 is initially driven through the medium of a friction-disk 46, secured upon the drive-shaft 39; but if the work to be performed be very hard the second shaft 44 is brought into action and its pulley is forced to an engagement with the pulley of the shaft 36. This is accomplished by means of a second friction-disk 47, which is loosely mounted on the shaft 39, yet is held to turn therewith by having a slot 48 produced in its hub and a pin 49 passed through the said slot into the shaft 39, the said friction-disk being adapted to engage with the pulley 45 of the shaft 44 and drive the same and likewise carry the shaft 44 in direction of the disk 46 to such an extent that the pulleys of the two shafts will engage, and such action is brought about by tightening a nut 51 at the inner end of the shaft 39, causing said nut to compress a spring 50, located between it and the hub of the auxiliary driving-disk 47, as is clearly shown in Fig. 1.

The direction in which the seed shall be scattered by the scattering-wheel E is regulated through the medium of a device which consists of a circular shell 52, located above the body portion of the scattering-wheel within the circle of the blades or wings 35, and the said shell is provided with an upper flange 53, which turns in suitable supports 54, secured to the bottom portion of the lower frame-plate 11, as is shown in Figs. 1 and 4, and in the shell 52 a semicircular opening 55 is produced through which the seed finds its escape, as the shell extends from the bottom portion of the frame-plate 11 to the upper surface of the scattering-wheel E. The said shell 52 of this regulator may be turned so as to cause the discharge of seed in direction of the inner side of the device or immediately behind the wagon by means of an attached handle 56, which enables the device to be readily turned in its bearings.

The quantity of seed carried in a pocket of the main delivery-wheel D is regulated through the medium of an angular scraper-arm 57, one member of which extends down through the outlet or discharge opening 22 of the main hopper to a greater or less extent into the pocket of the main delivery-wheel which may be below the said discharge-opening. This scraper-arm 57 is secured to one end of a shaft 58, journaled in suitable bearings upon the upper surface of the upper frame-plate 12 and extending within and without the base of the main hopper C, as is shown in Fig. 3. At the outer end of the shaft 58 a crank-arm 59 is secured which receives the bent end of a rod 60, provided with a collar 61, and this rod is threaded at its free end and is passed through a suitable bearing 62 on the upper frame-plate 12. A spring 63 is coiled around the said rod 60 between the collar 61 and the bearing 62, and at the outer threaded end of the rod 60 a thumb-nut 64 is located. Thus by operating the thumb-nut 64 the scraper-arm 57 is made to enter the discharge-opening 22 to a greater or less extent, and the said scraper-arm will not tend to stop the rotation of the main seed-delivery wheel when the arm is in its lowest position by reason of the spokes dividing the pockets not extending to the upper surface of the wheel.

The auxiliary seed-delivery wheel D' is operated through the medium of a shaft 65, journaled in bearings 66 and 67, extending, respectively, from the frame-plate 11 and the frame-plate 12, as is shown in Fig. 1, and the said shaft is provided at its inner end with a bevel-pinion 68, which meshes with the teeth 31 on the said auxiliary seed-delivery wheel, and at the outer end of the shaft 65 a sprocket-wheel 69 is located.

The main seed-delivery wheel D is operated through the medium of a shaft 71, journaled in suitable bearings 72, formed upon the lower frame-plate 11, and this shaft 71 carries at its inner end a bevel-pinion 70, which engages with the teeth of the said seed-delivery wheel D, as is shown in Figs. 1 and 3. A sprocket-wheel 73 is located at the outer end of the said shaft 71.

A chain belt 74 is passed over the sprocket-wheels 69 and 73 and over a sprocket-wheel 75, loosely mounted on the drive-shaft 39. This sprocket-wheel has a clutch member 75$^a$, designed to be engaged by a clutch member 75$^b$, mounted to slide on the shaft, but having a rotary connection therewith. In this manner when the clutch members are engaged the various parts of the device are driven and may be thrown out of motion by moving the clutch 75$^b$. By changing the sizes of the wheels 69 and 73 the bushels of grain per acre may be regulated. When it is not desired to use the auxiliary hopper and connected mechanism, a short driving-belt is employed, passed over the sprocket-wheels 75 and 73 only.

Having thus described my invention, I claim as new and desire to secure by Letters Patent—

1. In a seeder, a main and an auxiliary hopper, each provided with a discharge-opening, a seed-delivery wheel for the main hopper, and an auxiliary delivery-wheel for the auxiliary hopper, arranged to drop its seed on the seed-carrying sections of the delivery-wheel for the main hopper, as described.

2. In a seeder, a main and an auxiliary hopper, each provided with a discharge-opening, a seed-delivery wheel for the main hopper, an auxiliary delivery-wheel for the auxiliary hopper, arranged to drop its seed on the seed-carrying sections of the delivery-wheel for the main hopper, and an adjustable device for regulating the discharge of seed for the main seed-delivery wheel, as specified.

3. In a seeder, a main and an auxiliary hopper, each provided with a discharge-opening, a seed-delivery wheel for the main hopper and an auxiliary delivery-wheel for the auxiliary hopper, arranged to drop its seed on the seed-carrying section of the delivery-wheel for the main hopper, and a scattering-wheel mounted to revolve below the main seed-delivery wheel and receive the seed therefrom, substantially as described.

4. In a seeder, a main and an auxiliary hopper, each provided with a discharge-opening, a seed-delivery wheel for the main hopper and an auxiliary delivery-wheel for the auxiliary hopper, arranged to drop its seed on the seed-carrying section of the delivery-wheel for the main hopper, a scattering-wheel mounted to revolve below the main seed-delivery wheel and receive the seed therefrom, and a regulating device having shifting movement relative to the scattering-wheel and adapted to determine the direction in which the seed shall be scattered, substantially as described.

5. In a seeder, a main and an auxiliary hopper, each provided with a discharge-opening, a seed-delivery wheel for the main hopper mounted to revolve beneath the same and provided with pockets which receive seed from the discharge-opening of the main hopper, an auxiliary seed-delivery wheel mounted to revolve beneath the auxiliary hopper and over the main seed-delivery wheel, the auxiliary seed-delivery wheel being provided with series of pockets adapted to receive seed at the discharge-opening of the auxiliary hopper and to discharge seed into the pockets of the main seed-delivery wheel, a scraper-arm arranged to extend through the discharge-opening of the main hopper into a pocket of the main seed-delivery wheel, and a tension-controlled adjusting device for the said scraper-arm, substantially as described.

6. In a seeder, a main and an auxiliary hopper, each provided with a discharge-opening, a seed-delivery wheel for the main hopper, mounted to revolve beneath the same and provided with pockets which receive seed from the discharge-opening of the main hopper, an auxiliary seed-delivery wheel, mounted to revolve beneath the auxilary hopper and over the main seed-delivery wheel, being provided with series of pockets adapted to receive seed at the discharge-opening of the auxiliary hopper and to discharge seed into the pockets of the main seed-delivery wheel, a scattering-wheel mounted to revolve below the main seed-delivery wheel and to receive seed therefrom, the scattering-wheel consisting of a horizontal disk and vertical blades radially disposed upon the upper surface of the disk, and means substantially as described, for driving the said scattering-wheel and the seed-delivery wheels from a common drive-shaft, as and for the purpose described.

7. In a seeder, a main and an auxiliary hopper, each provided with a discharge-opening, a seed-delivery wheel for the main hopper, the said seed-delivery wheel being provided with a series of pockets, the divisions between the pockets being below the plane of the upper surface of the wheel and the said pockets being wider at the bottom than at the top, an auxiliary seed-delivery wheel mounted to revolve beneath the auxiliary hopper, having pockets therein receiving seed from the hopper and arranged to discharge seed in the pockets of the main seed-delivery wheel, a scattering-wheel located below the main seed-delivery wheel, a device for regulating the direction of discharge of the seed from the scattering-wheel, and means, substantially as described, for driving the said scattering-wheel and the seed-delivery wheels from a common drive-shaft, as specified.

8. In a seeder, a scattering-wheel, consisting of a plain flat disk body and a series of blades located upon the upper surface of the said body, extending radially from the periphery of the body and stopping short of its center, and a circular shell mounted to turn on the seed-scattering wheel within the circle formed by the inner ends of its blades, the said shell having a portion of its bottom cut away at one side to provide a semicircular discharge-opening, as and for the purpose described.

9. In a seeder, the combination with a main drive-shaft, a bracket through which said shaft passes, a second bracket above the supporting-bracket for the drive-shaft, a shaft journaled in the supporting-bracket for the drive-shaft and in the upper bracket, a seed-scattering wheel secured to the upper end of the said shaft, and a second shaft parallel to the seed-scattering-wheel shaft, mounted to turn in bearings slidably mounted in the said brackets, of alining conical friction-pulleys secured to the parallel shafts, a disk secured on the drive-shaft in frictional engagement with the friction-pulley on the wheel-supporting shaft, and a tension-controlled disk mounted to turn and to slide upon the drive-shaft, adapted for engagement with the pulley on the shaft parallel with the wheel-supporting shaft, for the purpose set forth.

In testimony whereof I have signed my name to this specification in the presence of two subscribing witnesses.

EMIL F. MOLCK.

Witnesses:
WILLIAM ACKERMANN,
JOHN LAUFENBURGER.